US008610974B2

(12) United States Patent
Takeuchi et al.

(10) Patent No.: US 8,610,974 B2
(45) Date of Patent: Dec. 17, 2013

(54) IMAGE READING APPARATUS

(75) Inventors: Masaru Takeuchi, Handa (JP); Naoyuki Iwata, Kagamihara (JP); Takayuki Akimatsu, Nagoya (JP); Tetsuya Ogawa, Nagoya (JP)

(73) Assignee: Brother Logyo Kabushiki Kaisha, Nagoya-shi, Aichi-ken (JP)

( * ) Notice: Subject to any disclaimer, the term of this patent is extended or adjusted under 35 U.S.C. 154(b) by 340 days.

(21) Appl. No.: 13/073,018

(22) Filed: Mar. 28, 2011

(65) Prior Publication Data

US 2011/0242622 A1 Oct. 6, 2011

(30) Foreign Application Priority Data

Mar. 30, 2010 (JP) ................................ 2010-077124

(51) Int. Cl.
*H04N 1/04* (2006.01)

(52) U.S. Cl.
USPC ............ 358/498; 358/496; 358/497; 358/494

(58) Field of Classification Search
USPC ................................. 358/474, 496, 497, 498
See application file for complete search history.

(56) References Cited

U.S. PATENT DOCUMENTS 5,923,438 A 7/1999 Fujiwara
6,178,274 B1 1/2001 Youda et al.
6,347,213 B1 2/2002 Yamanaka et al.
6,349,155 B1 2/2002 Youda et al.
7,035,566 B2 4/2006 Aiba
7,209,677 B2 4/2007 Aiba
7,379,700 B2 5/2008 Iwata
7,738,146 B2 6/2010 Osakabe et al.
7,755,810 B2 7/2010 Kuse
2002/0176115 A1 11/2002 Yamamoto
2003/0038989 A1 2/2003 Yokota et al.
2003/0048466 A1 3/2003 Yamada et al.
2003/0081269 A1 5/2003 Aoyama et al.

(Continued)

FOREIGN PATENT DOCUMENTS

JP HEI06-037995 A 2/1994
JP HEI07-291476 A 11/1995

(Continued)

OTHER PUBLICATIONS

JP Office Action dtd Mar. 27, 2012, JP Appln. 2010-077123, English translation.

(Continued)

*Primary Examiner* — Houshang Safaipour
(74) *Attorney, Agent, or Firm* — Banner & Witcoff, Ltd.

(57) ABSTRACT

An image reading apparatus may include a main unit and a cover unit pivotally attached to the main unit. The cover unit may include an image reading device configured to read an image of a document along a conveying path. The image reading device may include a contact image sensor, a sensor holder to hold the contact image sensor, an urging member, and a shock absorber. The contact image sensor is disposed below the conveying path. The sensor holder has an open top boxed shape and holds the contact image sensor in position inside. The urging member is disposed in an inner bottom surface of the sensor holder to urge the contact image sensor toward the conveying path. The shock absorber is disposed between a bottom surface of the contact image sensor and the inner bottom surface of the sensor holder, and is made of a porous material.

20 Claims, 7 Drawing Sheets

(56) References Cited

U.S. PATENT DOCUMENTS

| | | | | |
|---|---|---|---|---|
| 2004/0223796 | A1 | 11/2004 | Iwata | |
| 2005/0046912 | A1 | 3/2005 | Nobe et al. | |
| 2007/0019249 | A1 * | 1/2007 | Osakabe et al. | 358/474 |
| 2007/0047023 | A1 | 3/2007 | Oguri et al. | |
| 2007/0268529 | A1 | 11/2007 | Kuse | |
| 2008/0158621 | A1 | 7/2008 | Hamada et al. | |
| 2009/0049072 | A1 | 2/2009 | Wakahara | |
| 2009/0122365 | A1 | 5/2009 | Noda et al. | |
| 2010/0072690 | A1 | 3/2010 | Hiura et al. | |
| 2010/0165368 | A1 | 7/2010 | Matsuoka | |
| 2012/0170087 | A1 | 7/2012 | Nose et al. | |

FOREIGN PATENT DOCUMENTS

| | | | |
|---|---|---|---|
| JP | HEI08-340418 | A | 12/1996 |
| JP | HEI10-112771 | A | 4/1998 |
| JP | 10-145548 | | 5/1998 |
| JP | 2000-134417 | A | 5/2000 |
| JP | 2000-188665 | A | 7/2000 |
| JP | 2002-199168 | | 7/2002 |
| JP | 2003-051918 | A | 2/2003 |
| JP | 2003-140275 | | 5/2003 |
| JP | 2004-348124 | A | 12/2004 |
| JP | 2005-080128 | | 3/2005 |
| JP | 2005-167839 | A | 6/2005 |
| JP | 2006-333003 | | 12/2006 |
| JP | 2007-036426 | A | 2/2007 |
| JP | 2007-067810 | | 3/2007 |
| JP | 2007-311863 | A | 11/2007 |
| JP | 2008-156108 | A | 7/2008 |
| JP | 2000-236415 | A | 8/2008 |

OTHER PUBLICATIONS

JP Notice of Reasons for Rejection dated Feb. 7, 2012, corresponding Application No. 2010-077124; English Translation.

JP Decision to Grant a Patent dated Feb. 14, 2012, corresponding Application No. 2010-077125; English Translation.

Co-pending U.S. Appl. No. 13/073,065, filed Mar. 28, 2011.

Co-pending U.S. Appl. No. 13/073,105, filed Mar. 28, 2011.

Non-final Office Action received in U.S. Appl. No. 13/073,105 mailed Feb. 13, 2013.

Non Final Office Action issued in corresponding U.S. Appl. No. 13/073,065 mailed Mar. 29, 2013.

Final Office Action received in U.S. Appl. No. 13/073,105 mailed Jul. 24, 2013.

* cited by examiner 1
5
15
16
17
6
8
22
20
45
30
23
35
21A
12
10
11
31
60
33
70
75
24
50
7
40
25
32
21
TOP
BOTTOM
RIGHT
LEFT 25
43B
21
50
42
70
20
60
22
41
39
17
16
15
LEFT
REAR
TOP
BOTTOM
FRONT
RIGHT

IMAGE READING APPARATUS

CROSS REFERENCE TO RELATED APPLICATION

This application claims priority from Japanese Patent Application No. 2010-077124, filed on Mar. 30, 2010, the entire subject matter and contents of which is incorporated herein by reference.

TECHNICAL FIELD

Aspects of the invention relate to an image reading apparatus including a cover unit pivotally attached to a main unit, wherein the cover unit includes an image reading device configured to read an image of a document.

BACKGROUND

Some existing image reading apparatuses may include an image reading device and be configured to read an image of a document using the image reading device while conveying the document through a conveying path.

A known image reading apparatus includes a generally U-shaped conveying path connecting a document placement tray and a document ejection tray, and conveys a document placed on the document placement tray along the conveying path. The image reading apparatus includes a first image reading device and a second image reading device. The image reading apparatus is configured to read an image formed on a front side of the document using the first image reading device and then read an image formed on a back side of the document using the second image reading device while conveying the document along the conveying path.

The image reading apparatus is capable of a document fixing mode for reading an image of a document placed at rest on the platen glass and a document moving mode for reading an image of a document while moving or conveying the document along the conveying path. Thus, the first image reading device is disposed below the platen glass and facing a lower surface of the conveying path, and configured to read an image formed on a first surface of a document being conveyed. The second image reading device is disposed facing an upper surface of the conveying path on a downstream side of the first image reading device in a conveying direction in which a document is conveyed, and configured to read an image formed on a second surface of the document conveyed below the second image reading device.

To read an image of a document in the document fixing mode in the image reading apparatus, it is necessary to place a document on the platen glass. Thus, to open the platen glass, it is necessary to move or raise a unit including the document placement tray, the document ejection tray, the conveying path, and the second image reading device, which are all located on the platen glass.

However, as the unit including the second image reading device is moved every time an image of a document is read in the document fixing mode, the second image reading device may be subject to impact by the movement of the unit and thus be damaged or broken due to the impact.

SUMMARY

Aspects of the disclosure may provide an image reading apparatus in which a cover unit is pivotally attached to a main unit and includes an image reading device configured to read an image of a document, the image reading apparatus being configured to reduce damage to the image reading device.

According to an aspect of the invention, an image reading apparatus includes a main unit and a cover unit pivotally attached to the main unit. The cover unit includes a document tray configured to receive a document, a document conveying mechanism configured to convey the document received by the document tray along a conveying path, and an image reading device configured to read an image of the document conveyed along the conveying path. The image reading device includes a contact image sensor disposed below the conveying path such that a reading surface of the contact image sensor faces upward, a sensor holder having an open top box shape and configured to hold the contact image sensor in position inside, an urging member disposed in an inner bottom surface of the sensor holder to urge the contact image sensor in a reading position, and a shock absorber disposed between a bottom surface of the contact image sensor and the inner bottom surface of the sensor holder, the shock absorber being made of a porous material.

BRIEF DESCRIPTION OF THE DRAWINGS

Illustrative aspects of the disclosure will be described in detail with reference to the following figures in which like elements are labeled with like numbers and in which.

DETAILED DESCRIPTION

An illustrative embodiment of the invention will be described in detail with reference to the accompanying drawings.

The general structure of an illustrative image reading apparatus 1 as an example of an image reading apparatus according to illustrative aspects of the disclosure will be described with reference to FIGS. 1, 2, and 3.

For ease of discussion, in the following description, the top or upper side, the bottom or lower side, the left or left side, the right or right side, the front or front side, and the rear or rear side are used to define the various parts when the image reading apparatus 1 is disposed in an orientation in which it is intended to be used. In FIG. 1, the lower right side is referred to as the front or front side, the upper left side is referred to as the rear or the rear side, the up side is referred to as the top or upper side, the down side is referred to as the bottom or lower side, the lower left side is referred to as the left or left side, and the upper right side is referred to as the right or right side.

Figure 1:
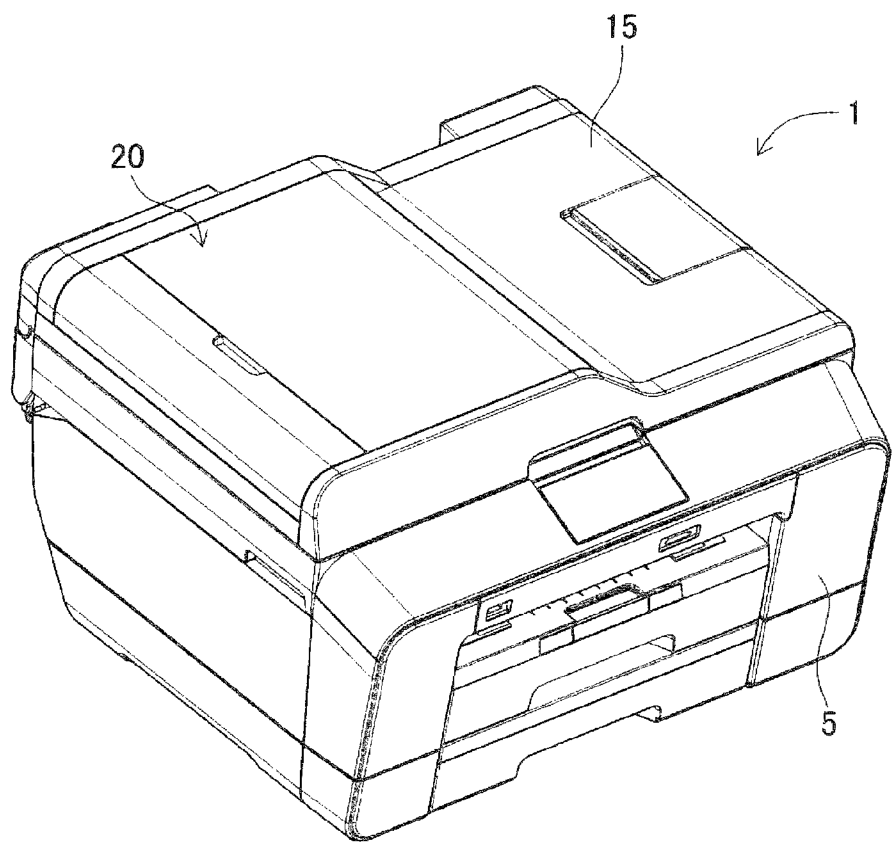
FIG. 1 is a perspective view of an image reading apparatus.
Figure 1:
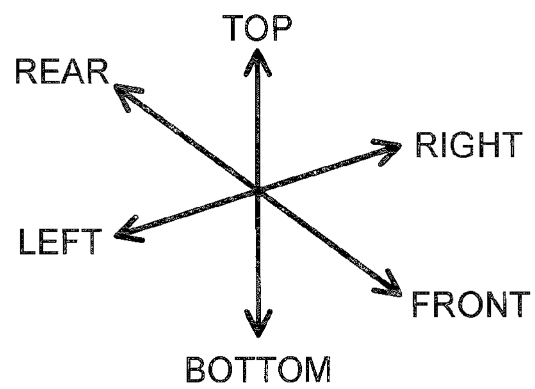
Figure 2:
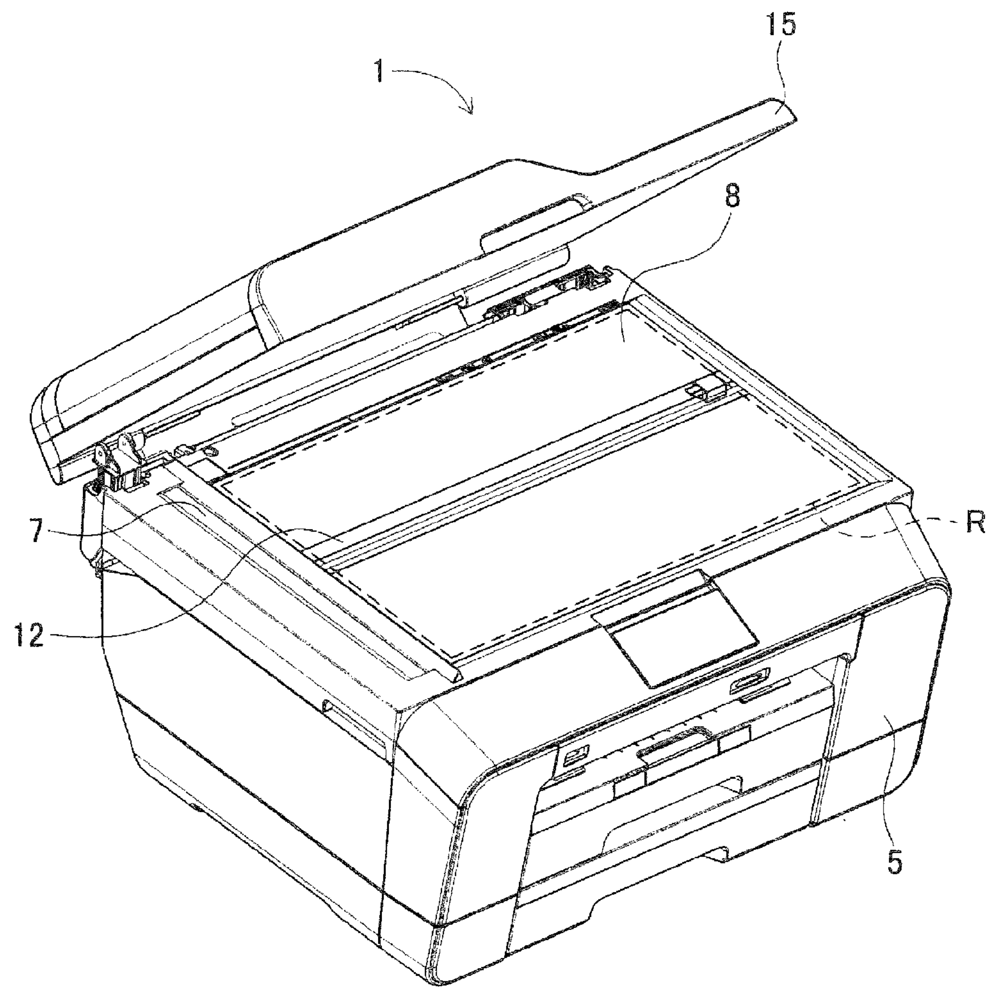
FIG. 2 is a perspective view of the image reading apparatus in which a cover unit is open.
Figure 2:
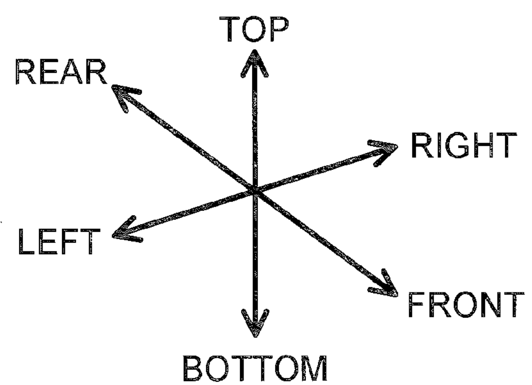
Figure 3:
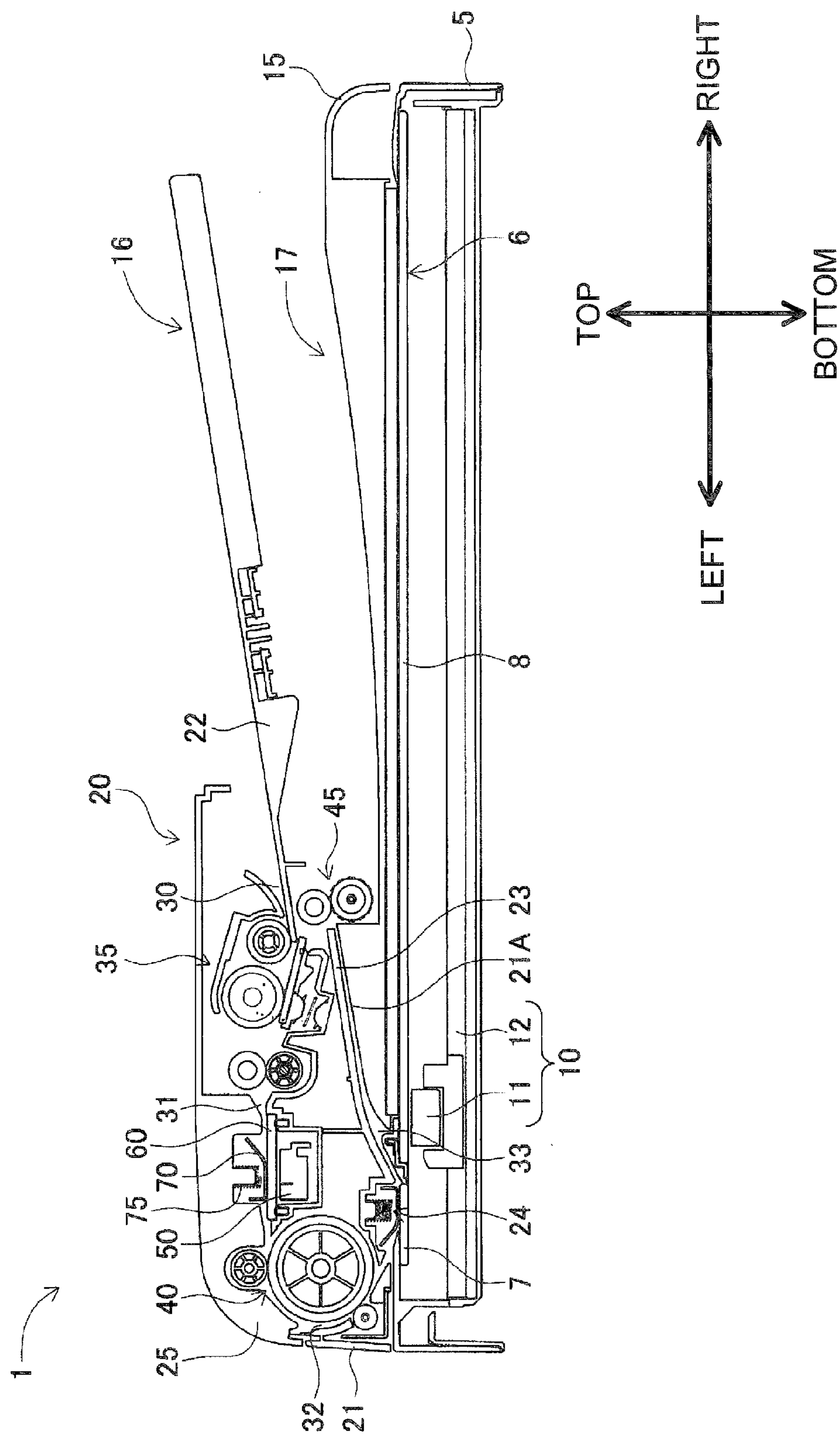
FIG. 3 is a cross sectional view illustrating a structure of the cover unit.

As shown in FIGS. 1, 2, and 3, the image reading apparatus 1 includes a main unit 5 including a first image reading device 10, and a cover unit 15 including an automatic document feeder (ADF) 20.

As shown in FIGS. 2 and 3, the main unit 5 includes a contact glass 6 on the top surface. The contact glass 6 includes a first glass 7 and a second glass 8. The first glass 7 is used when the first image reading device 10 remains stationary at a predetermined position and reads an image of a document conveyed by the ADF 20. When there are some documents to be read on the ADF 20, the documents are serially conveyed to pass over the first glass 7.

The second glass 8 is what is called a platen glass, and the long side of the second glass 8 extends along the right and left direction of the main unit 5. The second glass 8 is shaped in a rectangle slightly greater than A3 size. The second glass 8 is used when a first image sensor 11 of the first image reading device 10 moves to read an image of a document placed on the second glass 8.

As shown in FIGS. 2 and 3, the main unit 5 includes the first image reading device 10 below the contact glass 6. The first image reading device 10 includes the first image sensor 11 and a slid shaft 12. The first image sensor 11 is a so-called contact image sensor, CIS, and configured to read an image of a document on the contact glass 6.

The first image sensor 11 has a reading range whose length corresponds to the short side of the A3 size in the main scanning direction (that is, the front-rear direction in the main unit 5). The slide shaft 12 extends in the right-left direction in the main unit 5, and holds the first image sensor 11 such that the first image sensor 11 is slidable in the right-left direction. The first image sensor 11 can be slid along the slide shaft 12 by a motor and drive mechanism (e.g., a pulley and belt mechanism). The first image sensor 11 may be positioned at a stationary reading position under the first glass 7. In addition, the first image sensor 11 may be slidable in a range between a left position along the left edge of the second glass 8 and a right position away from the left position for a distance corresponding to the long side of the A3 size. Thus, the first image reading device 10 has the maximum reading range R corresponding to A3 size, and can read an image of a document of a size smaller than or equal to A3 size.

As shown in FIGS. 1 and 2, the cover unit 15 is disposed pivotally on the rear end of the top surface of the main unit 5 between a closed position shown in FIG. 1 and an open position shown in FIG. 2. The cover unit 15 covers the top surface of the main unit 5 when in the closed position. Thus, the cover unit 15 is configured to fix a document set on the second glass 8, in position. As shown in FIG. 3, the cover unit 15 includes a document tray 16, an ejection tray 17, and the ADF 20. The document tray 16 is disposed on an upper right side of the cover unit 15 and configured to receive a stack of documents to be read. The ejection tray 17 is disposed on the right side of the cover unit 15 and below the document tray 16, and configured to receive documents ejected from the ADF 20. The document tray 16 and the ejection tray 17 are arranged vertically.

The ADF 20 is disposed on the left side of the cover unit 15 and configured to successively and singly at a time feed documents in the document tray 16 through a U-shaped conveying path 30 to the ejection tray 17. In the embodiment, a direction from the document tray 16 along the U-shaped conveying path 30 to the ejection tray 17 is referred to as a document conveying direction. The ADF 20 includes a second image reading device 50 in a specified position along the U-shaped conveying path 30. The image reading apparatus 1 can read an image of a first surface (e.g. a back surface) of a document conveyed through the U-shaped conveying path 30 by the second image reading device 50.

Figure 4:
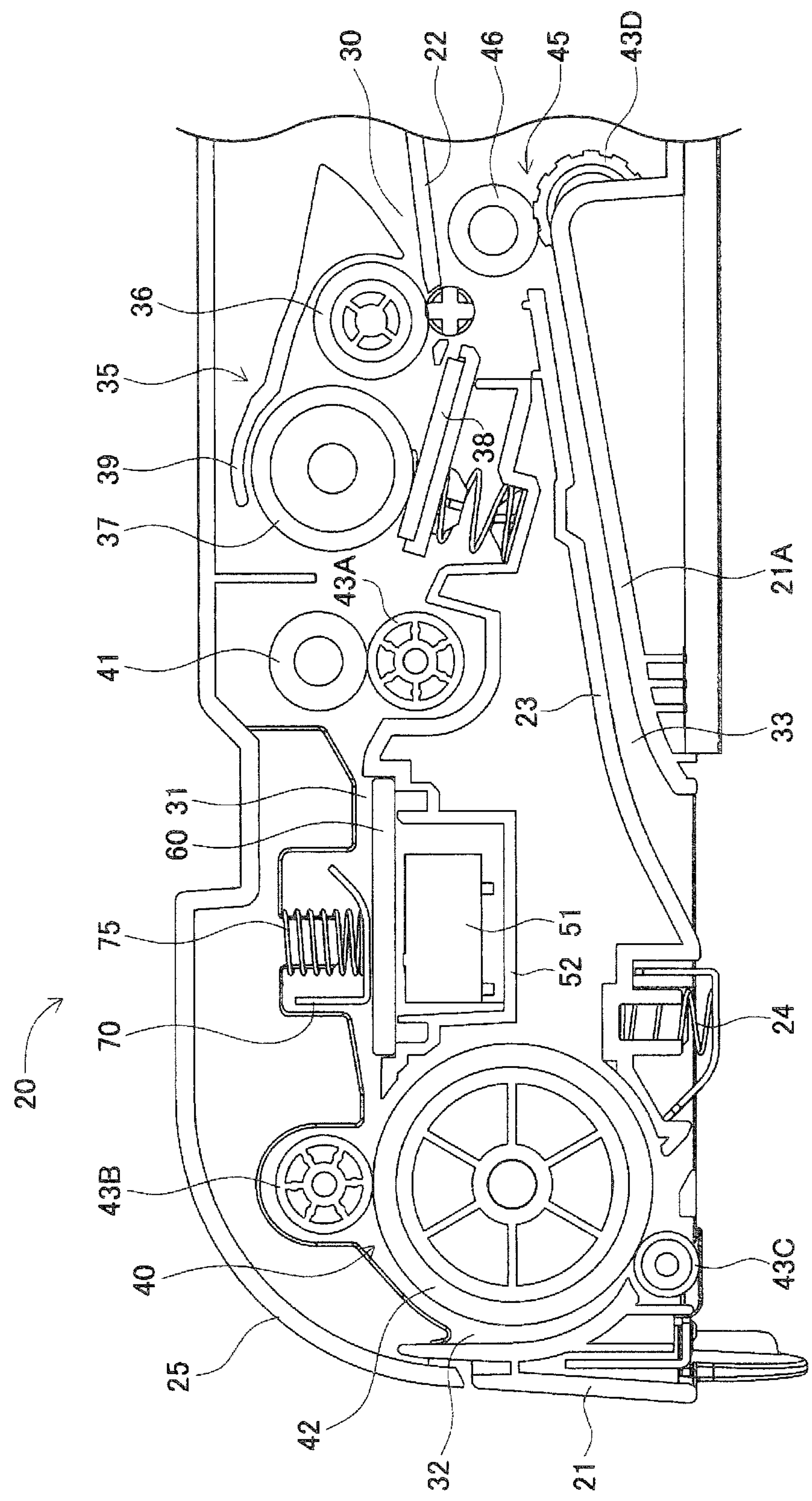
FIG. 4 is an enlarged cross sectional view illustrating a structure of an automatic document feeder.

As shown in FIGS. 3 and 4, the ADF 20 includes an opening in a specified position on the left side of the bottom surface of the ADF 20 (that is the bottom surface of the cover unit 15). The opening extends in the front-rear direction of the main unit 5 and faces the U-shaped conveying path 30. When the cover unit 15 is in the closed position, the opening is located above the first glass 7. Thus, a document to be conveyed through the U-shaped conveying path 30 is exposed at the opening in which a second surface (e.g. a front surface) of the document faces down. As a result, when the first image sensor 11 is located in the stationary reading position, the image reading apparatus 1 can read an image of the second surface of the document conveyed through the U-shaped conveying path 30 by the first image reading device 10.

The structure of the ADF 20 according to the embodiment will be described with reference to FIG. 3.

As shown in FIG. 3, the ADF 20 includes the U-shaped conveying path 30, a supply unit 35, a conveying unit 40, an ejection unit 45, and a second image reading device 50. With this structure, a document is conveyed and an image of the document is read through the U-shaped conveying path 30.

The ADF 20 further includes a main frame 21, an upper guide 22, a lower guide 23, and an upper cover 25. The main frame 21 constitutes a casing of the ADF 20 and is made of a synthetic resin, e.g. acrylonitrile butadiene styrene (ABS) resin.

The upper guide 22 is formed by extending a downstream end of the document tray 16 in the document conveying direction and configured to guide a document in the document tray 16 toward the supply unit 35. The lower guide 23 extends from the opening to the ejection tray 17, and is configured to guide the document conveyed through the U-shaped conveying path 30 to the ejection unit 45 and ejection tray 17. That is, the upper guide 22 and the lower guide 23 are arranged vertically such that the upper guide is located above the lower guide 23.

The upper cover 25 constitutes the top surface of the ADF 20, and is pivotally supported on a rotation shaft positioned at the left end of the ADF 20 (that is, the left end of the cover unit 15). The upper cover 25 is configured to move between a closed position shown in FIGS. 3 and 4 and an open position shown in FIG. 5. When the upper cover 25 is in the closed position, the upper cover 25 covers the supply unit 35, the conveying unit 40, and the upper portion of the second image reading device 50. Thus, the upper portion of the U-shaped conveying path 30 is covered. When the upper cover 25 is in the open position, the upper cover 25 is separated from the supply unit 35, the conveying unit 40 and the second image reading device 50, and the upper portion of the U-shaped conveying path 30 is exposed.

The structure of the U-shaped conveying path 30 in the ADF 20 will be described.

As shown in FIGS. 3 and 4, the U-shaped conveying path 30 is formed in a U-shape with respect to the right and left direction of the ADF 20 so as to connect the document tray 16 and the ejection tray 17. In other words, the U-shaped conveying path 30 is not configured to convey a document in the front-rear direction of the ADF 20. The U-shaped conveying path 30 is defined by a first conveying path 31, a curved conveying path 32, and a second conveying path 33.

Figure 5:
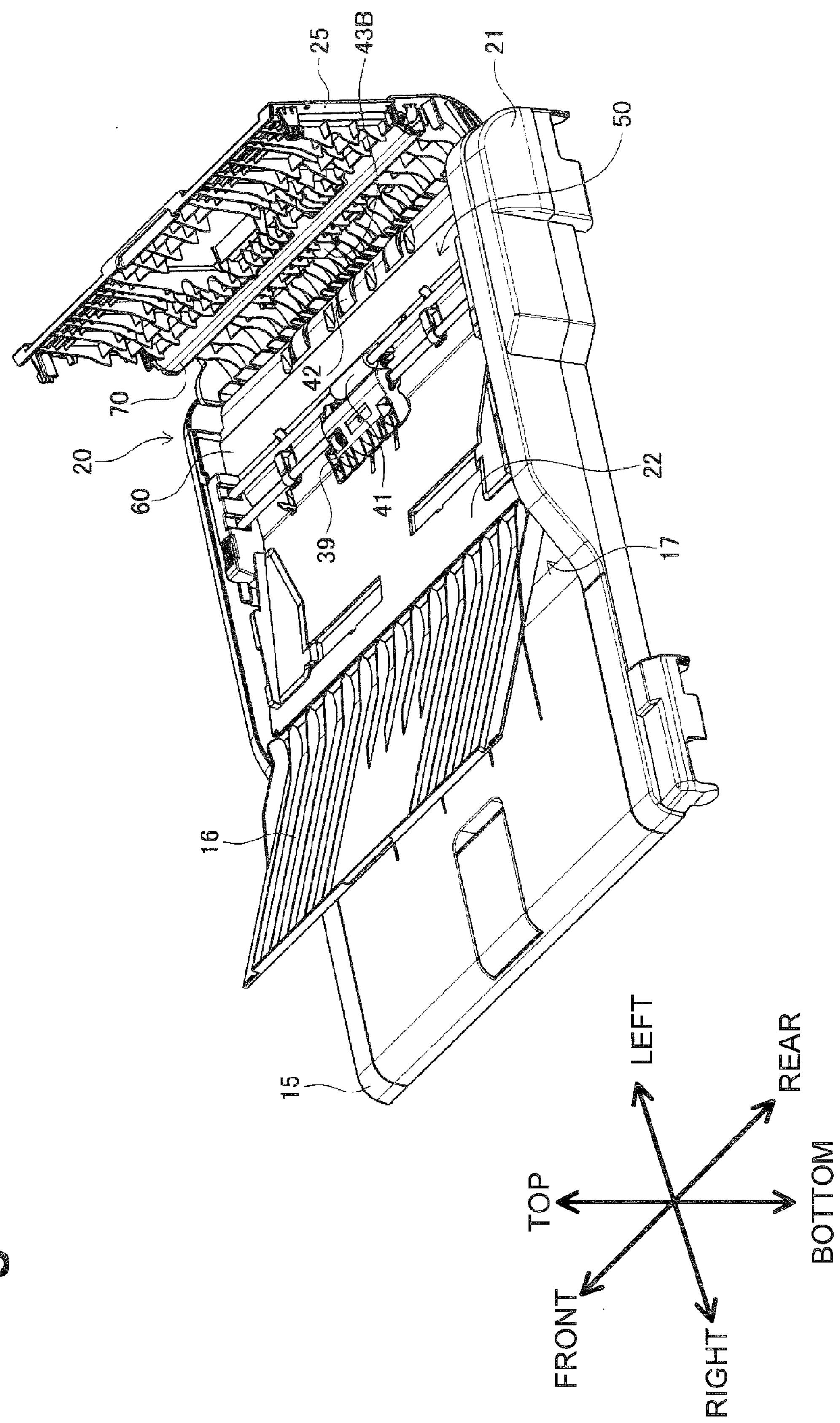
FIG. 5 is a perspective view of the cover unit in which an upper cover is in an open position.

The first conveying path 31 extends from the downstream end of the document tray 16 in the document conveying direction to the left end of the ADF 20 (above a main roller 42 shown in FIG. 4). When the upper cover 25 is in the closed position, the upper cover 25 covers the first conveying path 31 from above. As shown in FIG. 5, the inside surface of the upper cover 25 is provided with a plurality of ribs, which protrude toward the first conveying path 31 when the upper cover 25 is in the closed position. These ribs are configured to guide an upper surface of a document to be conveyed in the first conveying path 31. In other words, the inside surface of the upper cover 25 defines an upper surface of the first conveying path 31, together with a pickup roller 36 and a separation roller 36 of the supply unit 35, a conveying roller 41 of the conveying unit 40, and a document pressing member 70, which will be described later. The lower surface of the first conveying path 31 is defined by the upper surface of the upper guide 22, a separation pad 38, and a glass member 60 positioned above the second image reading device 50. These components defining the upper and lower surfaces of the first conveying path 31 comprise a first document conveying mechanism.

The curved conveying path 32 is curved downward from a downstream end of the first conveying path 31 in the document conveying direction to have a semicircular arc shape. As shown in FIG. 4, the curved conveying path 32 conforms to an outer surface of the main roller 42 and is connected to the second conveying path 33 on the left side of the ADF 20 (under the main roller 42). The curved conveying path 32 is defined by the outer surface of the main roller 42 and the main frame 21 and the inside surfaces of the upper cover 25. These components defining the curved conveying path 32 comprise a curved document conveying mechanism.

The second conveying path 33 generally straightly extends from the lower end of the curved conveying path 32 to the ejection unit 45 and the ejection tray 17. The second conveying path 33 is defined mainly by the lower guide 23 and a wall surface 21A of the main unit 21 of the cover unit 15, which is disposed facing and away from the lower guide 23. These components defining the second conveying path 33 comprise a second document conveying mechanism. The second conveying path 33 is located below the first conveying path 31. The second conveying path 33 includes a part facing the first glass 7 in the proximity of the main roller 42. When the document passes through the part facing the first glass 7, the document passes over the opening formed in the bottom surface of the cover unit 15. Thus, a document conveyed through the U-shaped conveying path 30 is conveyed via the opening to the ejection tray 17. A known document pressing portion 24 is disposed at a position facing the opening in the second conveying path 33. The document pressing portion 24 can bring the document closer to the first glass 7 when the document passes above the opening. Thus, the image reading apparatus 1 can improve the image reading accuracy by the first image reading device 10 at the first glass 7.

The supply unit 35 of the ADF 20 will be described with reference to FIG. 4.

The supply unit 35 is disposed in the proximity of an end of the first conveying path 31 closer to the document tray 16. The supply unit 35 is configured to separate documents placed on the document tray 16 and supply a document at one time toward the conveying unit 40. As shown in FIG. 4, the supply unit 35 includes a pickup roller 36, a separation roller 37, a separation pad 38, and an arm 39.

The pickup roller 36 is rotatably supported in a position along the upper surface of the first conveying path 31 on an upstream side in the supply unit 35 in the document conveying direction. The pickup roller 36 is driven and rotated in a predetermine direction (e.g. clockwise in FIG. 4) by drive of a motor (not shown) via a known transmission mechanism. The pickup roller 36 is configured to convey a document placed in the document tray 16 to the separation roller 37 (toward the downstream side in the document conveying direction).

The separation roller 37 is rotatably supported to the main frame 21 on the downstream side from the pickup roller 36 in the document conveying direction. The separation roller 37 is driven and rotated in a predetermined direction (e.g. clockwise in FIG. 4) by drive of a motor (not shown). The separation pad 38 is disposed at a position facing the separation roller 37 on the lower surface of the first conveying path 31. The separation pad 38 is urged toward the separation roller 37. Thus, the separation roller 37 and the separation pad 38 operate together such as to separate a document directly contacting the separation roller 37 and convey the document only to the conveying unit 40 (to the downstream side in the document conveying direction).

The arm 39 is supported via bearings to the rotation shaft of the separation roller 37. The arm 39 extends from the shaft of the separation roller 37 toward an upstream side in the document conveying direction, and rotatably supports both ends of the pickup roller 36. The arm 39 is configured to rock on the rotation shaft of the separation roller 37 by drive from the motor.

The conveying unit 40 of the ADF 20 will be described with reference to FIG. 4.

The conveying unit 40 is disposed on a downstream side of the supply unit 35 in the document conveying direction, and configured to convey the document supplied by the supply unit 35 along the U-shaped conveying path 30 toward the ejection unit 45. The conveying unit 40 includes a conveying roller 41, the main roller 42, and pinch rollers 43A, 43B, and 43C.

The conveying roller 41 is disposed on a downstream side of the supply unit 35 in the document conveying direction and in a position conforming to the upper surface of the first conveying path 31. The conveying roller 41 is driven by drive of a motor (not shown) and rotated. The pinch roller 43A is disposed at a position facing the conveying roller 41 in the first conveying path 31. Thus, the document supplied by the supply unit 35 is pinched by the conveying roller 41 and the pinch roller 43A and conveyed in the first conveying path 31 toward the downstream side in the document conveying direction along with the rotation of the conveying roller 41.

The main roller 42 is rotatably supported to the main frame 21 at the left end of the ADF 20, and driven by drive of a motor (not shown) and rotated. As described above, the curved conveying path 32 is formed conforming to the outer surface of the main roller 42. In other words, the outer surface of the main roller 42 constitutes a part of the curved conveying path 32.

The pinch roller 43B is disposed in the boundary between the first conveying path 31 and the curved conveying path 32 in an upper position of the main roller 42 and rotatably supported facing the main roller 42. Thus, the main roller 42 pinches the document conveyed in the first conveying path 31 along with the pinch roller 43B and rotates due to the drive of the motor such as to convey the document to the curved conveying path 32.

The pinch roller 43C is disposed in the boundary between the curved conveying path 32 and the second conveying path 33 in a lower position of the main roller 42 and rotatably supported facing the main roller 42. Thus, the main roller 42 pinches the document conveyed in the curved conveying path 32 along with the pinch roller 43C and rotates due to the drive of the motor so as to convey the document to the second conveying path 33.

The ejection unit 45 of the ADF 20 will be described with reference to FIG. 4.

The ejection unit 45 is configured to eject the document conveyed through the U-shaped conveying path 30 to the ejection tray 17. The ejection unit 45 includes an ejection roller 46 and the pinch roller 43D. The ejection roller 46 is rotatably supported at a position along the upper surface of the second conveying path 33 in the vicinity of the downstream end of the second conveying path 33 in the document conveying direction (that is, in the vicinity of the termination of the U-shaped conveying path 30). The ejection roller 46 is configured to rotate due to the drive of the motor. The pinch roller 43D is rotatably supported facing the ejection roller 46 from below via the second conveying path 33. Thus, the ejection roller 46 pinches the document conveyed through the second conveying path 33 along with the pinch roller 43D and rotates due to the drive of the motor so as to eject the document to the ejection tray 17.

The second image reading device 50 disposed in the ADF 20 will be described.

The second image reading device 50 is configured to read an image of a document conveyed in the first conveying path 31. As shown in FIG. 4, the second image reading device 50 is disposed downstream from the conveying roller 41 and upstream from the main roller 42 in the document conveying direction, and facing the lower surface of the first conveying path 31. The second image reading device 50 includes a second image sensor 51, a sensor holder 52, and a glass member 60.

The second image sensor 51 is what is called a contact image sensor (CIS), and is disposed with its reading surface for reading an image, facing up (toward the first conveying path 31). The second image sensor 51 has a reading range whose length corresponds to the short side of A4 size in the main scanning direction (that is, the front-rear direction in the main unit 5). A document conveyed in the first conveying path 31 passes over the reading surface of the second image sensor 51. Thus, the image reading apparatus 1 is configured to read an image formed on a first surface (back surface) of a document conveyed in the first conveying path 31 by the second image reading device 50.

The sensor holder 52 is box-shaped, open toward the first conveying path 31, and configured to hold the second image sensor 51 inside. As shown in FIGS. 3 and 4, the sensor holder 52 holds the second image sensor 51 in a predetermined position inside the sensor holder 52 (a position facing the first conveying path 31 and close to the glass member 60).

The glass member 60 is made of a reinforced glass and performs the same function as the first glass 7 and the second glass 8 for the first image sensor 11. The glass member 60 is disposed above the second image sensor 51 and along the lower surface of the first conveying path 31, and constitutes a part of the first conveying path 31.

The ADF 20 includes a document pressing member 70 and an urging member 75. The document pressing member 70 and the urging member 75 are disposed facing the second image reading device 50 via the first conveying path 31. Specifically, as shown in FIG. 5, the document pressing member 70 and the urging member 75 are disposed in position on an inner wall surface of the upper cover 25. When the upper cover 25 is in the closed position, the document pressing member 70 and the urging member 75 face the second image reading device 50 via the first conveying path 31. The urging member 75 is configured to urge the document holding member 70 toward the first conveying path 31 and the second image reading device 50 by its elastic force. Thus, the document pressing member 70 is configured to press the document conveyed in the first conveying path 31 toward the second image reading device 50. With this arrangement, the image reading apparatus 1 can improve the image reading accuracy of the second image reading device 50.

The following will describe automatic document reading operation for reading images on both surfaces (a first surface and a second surface) of a document in the image reading apparatus 1 according to the embodiment. In the following description, it is assumed that documents to be read are set in the document tray 16 with their first surfaces facing up and the first image sensor 11 is located in the stationary reading position under the first glass 7.

The uppermost document set in the document tray 16 contacts the pickup roller 36 of the supply unit 35. Thus, the document is supplied from the document tray 16 by the rotation of the pickup roller 36 due to the drive of the motor, and is conveyed via the separation roller 37 along the first conveying path 31 to the conveying unit 40. The document conveyed to the conveying unit 40 is conveyed by the conveying roller 41 and the pinch roller 43A, and passes over the second image reading device 50. At this time, as the second surface of the document faces the second image reading device 50, the second image reading device 50 reads an image formed on the second surface of the document.

After passing over the second image reading device 50, the document goes in the curved conveying path 32, and is conveyed to the ejection unit 45 by the rotation of the main roller 42. After passing through the curved conveying path 32, the first surface of the document faces down. When going in the second conveying path 33 after the curved conveying path 32, the document reaches the document pressing portion 24 and the first glass 7. As described above, the opening is formed on the bottom surface of the cover unit 15 and in the vicinity of the document pressing portion 24. The document is exposed from the opening. The first glass 7 is located in the position facing the opening, and the first image sensor 11 is located below the first glass 7. Thus, the first surface of the document faces the first image reading device 10. When the document passes in an area of the second conveying path 33, which is formed by the document pressing portion 24 and the first glass 7, the first image reading device 10 reads an image of the first surface of the document.

After the image is read by the first image reading device 10, the document is conveyed along the second conveying path 33 to the ejection unit 45. When reaching the ejection unit 45, the document is conveyed to the ejection tray 17 by the rotation of the ejection roller 46.

Figure 7:
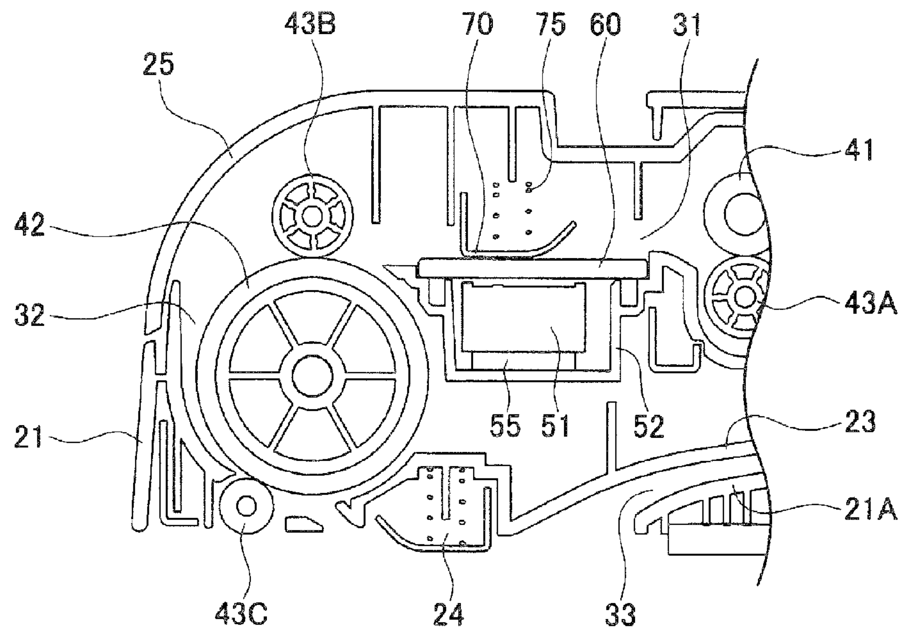
FIG. 7 is a cross sectional view of the second image reading device in which the cover unit is in the closed position.
Figure 8:
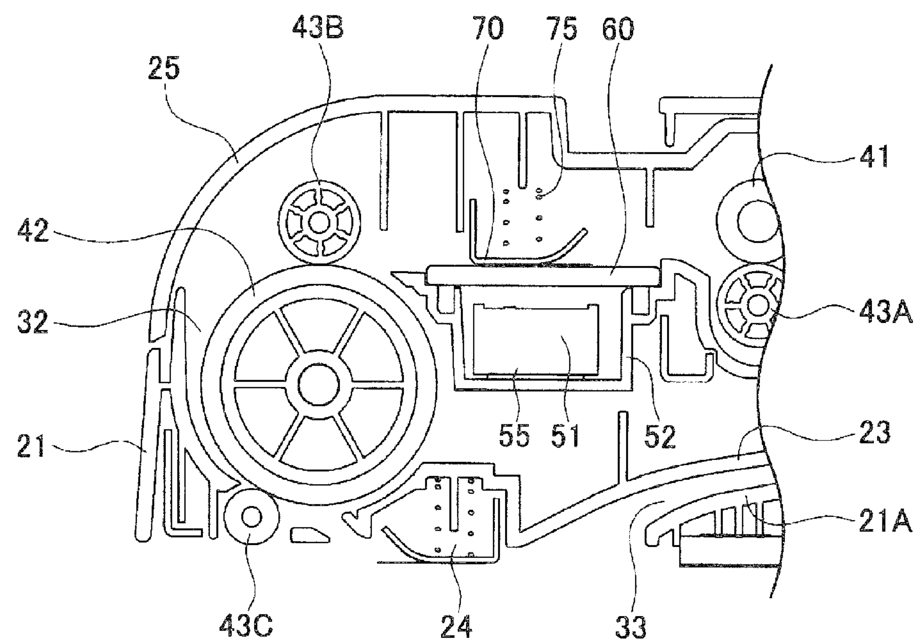
FIG. 8 is cross sectional view of the second image reading device in which the cover unit is moved.

The structure of the second image reading device 50 will be described with reference to FIGS. 6-8.

The second image reading device 50 includes coil springs 53 and shock absorbers 55, in addition to the second image sensor 51, the sensor holder 52 and the glass member 60.

As described above, the second image sensor 51 is a CIS and is disposed such that its reading surface faces toward the first conveying path 31. As shown in FIGS. 6-8, the second image sensor 51 is generally box-shaped, and its long side extends in the main scanning direction. The sensor holder 52 is box-shaped, open toward the first conveying path 31, and configured to hold the second image sensor 51 inside.

Figure 6:
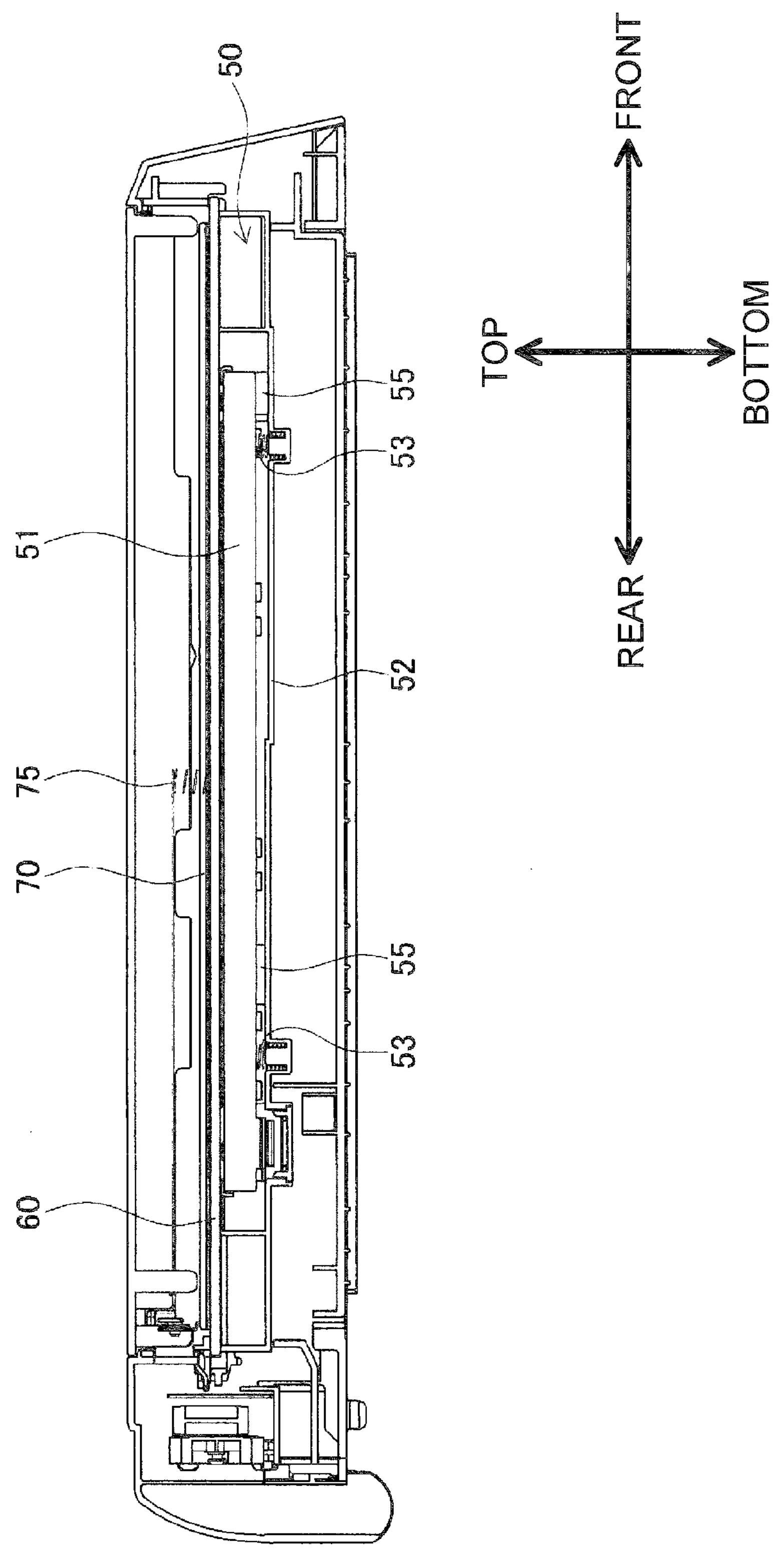
FIG. 6 is a vertical cross-sectional view of a second image reading device along a main scanning direction.

As shown in FIG. 6, the coil springs 53 are disposed between the bottom surface of the second image sensor 51 and the inner bottom surface of the sensor holder 52 in proximity to both end portions of the second image sensor 51 in the main scanning direction (or its longitudinal direction). The coil springs 53 are configured to apply urging force acting from the inner bottom surface of the sensor holder 52 toward the first conveying path 31 to the bottom surface of the second image sensor 51. Thus, the coil springs 53 apply an urging force to place the second image sensor 51 in a reading position facing the first conveying path 31 and proximate to the glass member 60.

As shown in FIG. 6, the shock absorbers 55 are disposed between the bottom surface of the second image sensor 51 and the inner bottom surface of the sensor holder 52 in proximity to both end portions of the second image sensor 51 in the main scanning direction (or its longitudinal direction). The shock absorbers 55 function as spacers to fill the space between the bottom surface of the second image sensor 51 and the inner bottom surface of the sensor holder 52 underneath the second image sensor 51. Thus, as shown in FIGS. 6 and 7, the shock absorbers 52 are also configured to hold the second image sensor 51 in position. The shock absorbers 55 are made of synthetic sponge which is a porous material.

The synthetic sponge refers to a sponge formed by foaming a synthetic resin such as polyurethane.

As described above, when a document is set on the second glass 8 in the image reading apparatus 1 according to the embodiment, it is necessary to raise the cover unit 15 pivotally on the rear end of the top surface of the main unit 5 and expose the second glass 8 (FIG. 2). When an image of the document placed on the second glass 8 is read by the first image reading device 10, it is necessary to pivot the cover unit 15 downward to cover the contact glass 6 (FIG. 1) such that the position of the document is fixed, ambient light is excluded and image can be read with high reading quality.

When the cover unit 15 is pivoted relative to the main unit 5, the second image sensor 51 may be movable within the sensor holder 52. The second image sensor 51 may be likely to move especially in the direction of thickness of the sensor holder 52 (up and down in FIG. 7). At this time, as shown in FIG. 8, the shock absorbers 55 are deformed in accordance with the movement of the second image sensor 51, to reduce a chance of contacting the second image sensor 51 and any inner wall surface in the sensor holder 52. Thus, even when the cover unit 15 is frequently pivoted, the image reading apparatus 1 can reduce potential for breakage of the second image sensor 51 and failure of the second image reading device 50.

The second image sensor 51 is urged toward the first conveying path 31 by the urging force of the coil springs 53. Accordingly, when the second image sensor 51 is moving toward the inner wall surface of the sensor holder 52, the urging force of the coil springs 53 acts as a reaction force to movement of the second image sensor 51. The image reading apparatus 1 can make use of the urging force to reduce potential for breakage of the second image sensor 51 in accordance with the pivotal movement of the cover unit 15.

As shown in FIG. 2, the cover unit 15 is supported to the main unit 5 such that the cover unit 15 is pivotable regarding the rear of the main unit 5 as a rotation axis. As shown in FIG. 5, the main scanning direction (or the longitudinal direction) of the second image sensor 51 agrees with the front-rear direction of the main unit 5. Thus, the front end portion (FIG. 6) of the second image sensor 51, which is furthest remote from the rotation axis of the cover unit 15, is most greatly moved in accordance with the pivotal movement of the cover unit 15. However, as shown in FIG. 6, in the image reading apparatus 1, the shock absorber 55 is located just under the front end portion of the second image reader 51 to fill the space between the bottom surface of the second image sensor 51 and the inner wall surface of the sensor holder 52. Thus, in the image reading apparatus 1, the shock absorber 55 can reliably protect the front end portion of the second image sensor 51 which may be most greatly moved in accordance with the pivotal movement of the second image sensor 51 and have a high probability of receiving a strong shock.

In the image reading apparatus 1, the shock absorber 55 is located under the rear end portion (FIG. 6) of the second image sensor 51, which is located close to the rotation axis of the cover unit 15, to fill the space between the bottom surface of the second image sensor 51 and the inner wall surface of the sensor holder 52. Thus, in the image reading apparatus 1, the shock absorber 55 can reliably protect the front end portion of the second image sensor 51 which may be most greatly moved in accordance with the pivotal movement of the second image sensor 51 and have a high probability of receiving a shock.

As described above, the second image reading device 50 includes the glass member 60, which is made of a reinforced glass and disposed above the second image sensor 51. There is a probability that the glass member 60 and the second image sensor 51 may contact in accordance with the pivotal movement of the cover unit 15. However, as the glass member 60 is made of reinforced glass, the potential for breakage of the second image reading device 50, especially breakage of the glass member 60, can be reduced.

As described above, the image reading apparatus 1 according to the embodiment includes the main unit 5 having the first image reading device 10, and the cover unit 15 pivotally attached to the rear side of the main unit 5. When the cover unit 15 is in the closed position, the cover unit 15 is configured to fix a document set on the second glass 8, which is disposed on the top surface of the main unit 5, while covering the second glass 8. The first image reading device 10 is configured to read an image of a document set on the second glass 8 while slidably moving along the slide shaft 12. Thus, the image reading apparatus 1 is configured to allow the first image reading device 10 to read an image of a document set on the second glass 8 (within the maximum reading range R). The cover unit 15 includes the document tray 16, the ejection tray 17, the U-shaped conveying path 30, and the second image reading device 50. While a document set in the document tray 16 is conveyed through the U-shaped conveying path 30, an image of the document is read by the second image reading device 50.

The second image reading device 50 includes the second image sensor 51, the sensor holder 52, the coil springs 53, and the shock absorbers 55. The second image sensor 51 is held in the sensor holder 52, which is box-shaped and open upwardly. When the cover unit 15 is pivoted, the second image sensor 51 may move inside the sensor holder 52. In the image reading apparatus 1, the coil springs 53 and the shock absorbers 55 are located between the bottom surface of the second image sensor 51 and the inner bottom surface of the sensor holder 52. Thus, the image reading apparatus 1 can reduce the chance of contacting the second image sensor 51 and the inner bottom surface of the sensor holder 52 and the potential for breakage of the second image sensor 51.

The shock absorbers 55 are made of synthetic sponge, and function as spacers to fill the space between the bottom surface of the second image sensor 55 and the inner bottom surface of the sensor holder 52. Thus, the image reading apparatus 1 can reliably reduce the chance of contacting the bottom surface of the second image sensor 55 and the inner bottom surface of the sensor holder 52, and the potential for breakage of the second image sensor 51.

The shock absorbers 55 fill the space between the bottom surface of the second image sensor 55 and the inner bottom surface of the sensor holder 52 in both end portions of the second image sensor 51 in the main scanning direction. Thus, the image reading apparatus 1 can protect portions of the second image sensor 51 having high potential of being broken in accordance with the pivotal movement of the cover unit 15, and reduce the potential for breakage of the second image sensor 51.

The image reading apparatus 1 includes the glass member 60 made of reinforced glass at the position facing the second image sensor 51. The image reading apparatus 1 can reduce the potential of breakage of the second image reading device 50, especially breakage of the glass member 60, because the glass member 60 is made of reinforced glass.

The illustrative embodiment shows, but is not limited to, the shock absorbers 55 made of synthetic sponge. The shock absorbers 55 may be made of sponge rubber. The sponge rubber refers to a rubber kneaded with a blowing agent and a softening agent and vulcanized. The hardness of the sponge rubber can be adjusted by adjusting the compositions of rubber raw material and blowing agent and other chemical agents. Thus, sponge rubber having hardness adequate for the shock absorbers 55 may be used.

Although an illustrative embodiment and examples of modifications of the present invention have been described in detail herein, the scope of the invention is not limited thereto. It will be appreciated by those skilled in the art that various modifications may be made without departing from the scope of the invention. Accordingly, the embodiment and examples of modifications disclosed herein are merely illustrative. It is to be understood that the scope of the invention is not to be so limited thereby, but is to be determined by the claims which follow.

What is claimed is:

1. An image reading apparatus comprising:
a main unit; and
a cover unit pivotally attached to the main unit, the cover unit including:
a document tray configured to receive a document;
a document conveying mechanism configured to convey the document received by the document tray along a conveying path; and
an image reading device configured to read an image of the document conveyed along the conveying path,
wherein the image reading device includes:
a contact image sensor disposed below the conveying path such that a reading surface of the contact image sensor faces upward;
a sensor holder having an open top box shape and configured to hold the contact image sensor in position inside;
an urging member disposed in an inner bottom surface of the sensor holder to urge the contact image sensor toward a reading position; and
a shock absorber disposed at an end portion of the contact image sensor in a main scanning direction between a bottom surface of the contact image sensor and the inner bottom surface of the sensor holder, the shock absorber being made of a porous material,
wherein a first distance between the end portion of the contact image sensor in the main scanning direction where the shock absorber is disposed and an end of the cover unit where the cover unit is pivotally attached to the main unit is greater than a second distance between another end portion of the contact image sensor in the main scanning direction and the end of the cover unit.

2. The image reading apparatus according to claim 1, wherein the shock absorber is a spacer disposed between the bottom surface of the contact image sensor and the inner bottom surface of the sensor holder.

3. The image reading apparatus according to claim 1,
wherein the image reading device includes a glass member made of a reinforced glass, and
wherein the glass member is disposed facing the contact image sensor.

4. The image reading apparatus according to claim 1,
wherein the main unit includes a platen glass configured to support a further document and a main unit-side image reading device configured to read an image of the further document supported by the platen glass while moving,
wherein the cover unit is configured to move between an open position and a closed position relative to the main unit, and
wherein the cover unit is configured to cover the platen glass and fix the document supported by the platen glass when in the closed position.

5. The image reading apparatus according to claim 1, wherein the shock absorber is made of a synthetic sponge.

6. The image reading apparatus according to claim 1, wherein the shock absorber is made of a sponge rubber.

7. The image reading apparatus according to claim 1, wherein the urging member includes a coil spring.

8. The image reading apparatus according to claim 1, wherein the cover unit is configured to pivot about an axis extending in a direction perpendicular to a main scanning direction.

9. The image reading apparatus according to claim 1, further comprising a second shock absorber that is disposed closer to the end of the cover unit where the cover unit is pivotally attached to the main unit than the urging member.

10. An image reading apparatus comprising:
a main unit; and
a cover unit pivotally attached to the main unit, the cover unit including:
a document tray configured to receive a document;
a document conveying mechanism configured to convey the document received by the document tray along a conveying path; and
an image reading device configured to read an image of the document conveyed along the conveying path,
wherein the image reading device includes:
a contact image sensor disposed below the conveying path such that a reading surface of the contact image sensor faces upward;
a sensor holder having an open top box shape and configured to hold the contact image sensor in position inside;
urging members disposed in an inner bottom surface of the sensor holder to urge the contact image sensor toward a reading position; and
a shock absorber disposed at an end portion of the contact image sensor in a main scanning direction between a bottom surface of the contact image sensor and the inner bottom surface of the sensor holder, the shock absorber being made of a porous material,
wherein the end portion of the contact image sensor in the main scanning direction where the shock absorber is disposed is further from an end of the cover unit where the cover unit is pivotally attached to the main unit than the urging members.

11. The image reading apparatus according to claim 10, further comprising a second shock absorber that is disposed closer to the end of the cover unit where the cover unit is pivotally attached to the main unit than one of the urging members.

12. The image reading apparatus according to claim 10, wherein the shock absorber is a spacer disposed between the bottom surface of the contact image sensor and the inner bottom surface of the sensor holder.

13. The image reading apparatus according to claim 10,
wherein the image reading device includes a glass member made of a reinforced glass, and wherein the glass member is disposed facing the contact image sensor.

14. The image reading apparatus according to claim 10, wherein the main unit includes a platen glass configured to support a further document and a main unit-side image reading device configured to read an image of the further document supported by the platen glass while moving, wherein the cover unit is configured to move between an open position and a closed position relative to the main unit, and wherein the cover unit is configured to cover the platen glass and fix the document supported by the platen glass when in the closed position.

15. The image reading apparatus according to claim 10, wherein the shock absorber is made of a synthetic sponge.

16. The image reading apparatus according to claim 10, wherein the shock absorber is made of a sponge rubber.

17. The image reading apparatus according to claim 10, wherein the urging members include a coil spring.

18. The image reading apparatus according to claim 10, wherein the cover unit is configured to pivot about an axis extending in a direction perpendicular to a main scanning direction.

19. An image reading apparatus comprising:

a main unit; and a cover unit pivotally attached to the main unit, the cover unit including:

a document tray configured to receive a document;

a document conveying mechanism configured to convey the document received by the document tray along a conveying path; and an image reading device configured to read an image of the document conveyed along the conveying path, wherein the image reading device includes:

a contact image sensor disposed below the conveying path such that a reading surface of the contact image sensor faces upward;

a sensor holder having an open top box shape and configured to hold the contact image sensor in position inside;

an urging member disposed in an inner bottom surface of the sensor holder to urge the contact image sensor toward a reading position; and a shock absorber disposed at an end portion of the contact image sensor in a main scanning direction between a bottom surface of the contact image sensor and the inner bottom surface of the sensor holder, the shock absorber being made of a porous material, wherein the end portion of the contact image sensor in the main scanning direction where the shock absorber is disposed is further from an end of the cover unit where the cover unit is pivotally attached to the main unit than the urging member.

20. The image reading apparatus according to claim 19, further comprising a second shock absorber that is disposed closer to the end of the cover unit where the cover unit is pivotally attached to the main unit than the urging member.

* * * * *

UNITED STATES PATENT AND TRADEMARK OFFICE

CERTIFICATE OF CORRECTION

PATENT NO. : 8,610,974 B2
APPLICATION NO. : 13/073018
DATED : December 17, 2013
INVENTOR(S) : Masaru Takeuchi et al.

It is certified that error appears in the above-identified patent and that said Letters Patent is hereby corrected as shown below:

On the Title Page, under Assignee:
Please delete "Logyo" and insert --Kogyo--

Signed and Sealed this
Seventeenth Day of November, 2015

Michelle K. Lee
*Director of the United States Patent and Trademark Office*